(12) United States Patent
Chen

(10) Patent No.: US 8,070,114 B2
(45) Date of Patent: Dec. 6, 2011

(54) SUPPORT STAND

(75) Inventor: Hong Jen Chen, Taipei County (TW)

(73) Assignee: Chen-Source Inc., Taoyuan County (TW)

( * ) Notice: Subject to any disclaimer, the term of this patent is extended or adjusted under 35 U.S.C. 154(b) by 0 days.

(21) Appl. No.: 12/795,324

(22) Filed: Jun. 7, 2010

(65) Prior Publication Data

US 2010/0327129 A1 Dec. 30, 2010

(30) Foreign Application Priority Data

Jun. 25, 2009 (TW) .............................. 98211481 U

(51) Int. Cl.
*F16L 3/00* (2006.01)
*A47F 5/00* (2006.01)

(52) U.S. Cl. .................. 248/121; 248/276.1; 248/278.1; 248/281.11; 248/917; 248/919

(58) Field of Classification Search .................. 248/121, 248/122.1, 123.11, 274.1, 276.1, 278.1, 280.11, 248/281.11, 917, 919
See application file for complete search history.

(56) References Cited

U.S. PATENT DOCUMENTS

| | | | | |
|---|---|---|---|---|
| 6,478,275 B1 * | 11/2002 | Huang | ........................ | 248/284.1 |
| 6,592,090 B1 * | 7/2003 | Li | .............................. | 248/284.1 |
| 7,207,537 B2 * | 4/2007 | Hung | ......................... | 248/284.1 |
| 7,338,002 B2 * | 3/2008 | Hamming | ................... | 242/332.4 |
| 7,364,127 B2 * | 4/2008 | Huang | ........................ | 248/276.1 |
| 7,510,155 B2 * | 3/2009 | Huang et al. | ............... | 248/278.1 |
| 7,604,210 B2 * | 10/2009 | Oddsen et al. | ........... | 248/280.11 |
| 7,810,773 B2 * | 10/2010 | Chi | ............................. | 248/278.1 |

* cited by examiner

*Primary Examiner* — Anita M King
(74) *Attorney, Agent, or Firm* — Muncy, Geissler, Olds & Lowe, PLLC

(57) ABSTRACT

A support stand includes a mounting assembly mountable on a table top, a suspension arm coupled to a rod member of the mounting assembly to hold a rotary barrel, a swinging arm pivotally connected to the rotary barrel of the suspension arm, a stretcher mounted in a frame bar of the swinging arm and a holder frame assembly coupled to the swinging arm to support an object. The stretcher includes a sleeve coupled to arched sliding slots of the frame bar of the swinging arm by a pivot pin, a connection frame plate pivotally coupled between the pivot pin and a mounting lug at the rotary barrel, a spring member and an adjustment screw assembly mounted in the sleeve for allowing adjustment of the elevation of the supported object with less effort and positive positioning of the supported object after an elevation adjustment.

9 Claims, 7 Drawing Sheets ns. SUPPORT STAND

This application claims the priority benefit of Taiwan patent application number 098211481, filed on Jun. 25, 2009.

BACKGROUND OF THE INVENTION

1. Field of the Invention

The present invention relates to a support stand for supporting an object on a table top and more particularly, to a swinging arm for support stand that has a stretcher mounted in the swinging arm thereof to facilitate adjustment of the inclination angle of the swinging arm with less effort.

2. Description of the Related Art

A support stand may be used in the office, classroom or exhibition center to hold a telephone holder or LCD monitor on a table top. By means of the use of an adjustable support stand to support an object, for example, a LCD monitor on a stable top, viewers can see the images displayed on the LCD monitor comfortably, avoiding tired eyes. However, regular flat panel support stands simply allow adjustment of the angle of the support arm in horizontal. There are known support stands that allow adjustment of the angle of inclination. However, these inclination adjustable support stands wear quickly with use. After a long use, these inclination adjustable support stands may be unable to keep the swinging arm in position, and the load of the supported object to cause the swinging arm to incline, loosing the inclination angle adjustment function. Further, regular inclination adjustable support stands have no means to stop the joint between the suspension arm and the swinging arm from unintensional biasing after an adjustment, and the supported LCD monitor may be not kept in the desired position. Therefore, regular flat panel support stands cannot be used to support a big size LCD monitor. For holding a big size LCD monitor on a table, a heavy duty suspension frame structure shall be used. Further, a stop structure may be installed in a support stand at the joint between the suspension arm and the swinging arm to avoid unintensional inclination of the swinging arm due to the effect of the weight of the supported object. However, the use of the stop structure may cause uneven distribution of the applied pressure during an adjustment. Thus, the user may have to apply much pressure when adjusting angle the swinging arm in one particular direction, for example, the downwards or upwards direction.

Therefore, it is desirable to provide a support stand that overcomes the aforesaid problems.

SUMMARY OF THE INVENTION

The present invention has been accomplished under the circumstances in view. It is one object of the present invention to provide a support stand, which allows adjustment of the elevation of the supported object conveniently with less effort and assures positive positioning after each elevation adjustment.

The support stand uses a stretcher in a swinging arm to stabilize angular adjustment of the swinging arm so that the user can adjust the elevation of the swinging arm positively with less effort. The stretcher comprises a sleeve that has a pivot pin transversely disposed at a bottom end thereof and coupled to and movable along an arched sliding slot on each of two opposite lateral side walls of a frame bar of the swinging arm and a stop flange extending around the periphery above the pivot pin thereof, a connection frame plate pivotally coupled between the pivot pin at the bottom end of the sleeve and the suspension arm, and a spring member mounted around the sleeve and stopped between the stop flange of the sleeve and a part of the frame bar of the swinging arm.

The stretcher further comprises an adjustment screw assembly rotatable to move a stop plate upwards or downwards relative to the spring member, thereby adjusting the spring power of the spring member subject to the weight of the object to be supported.

DETAILED DESCRIPTION OF THE PREFERRED EMBODIMENT

Figure 1:
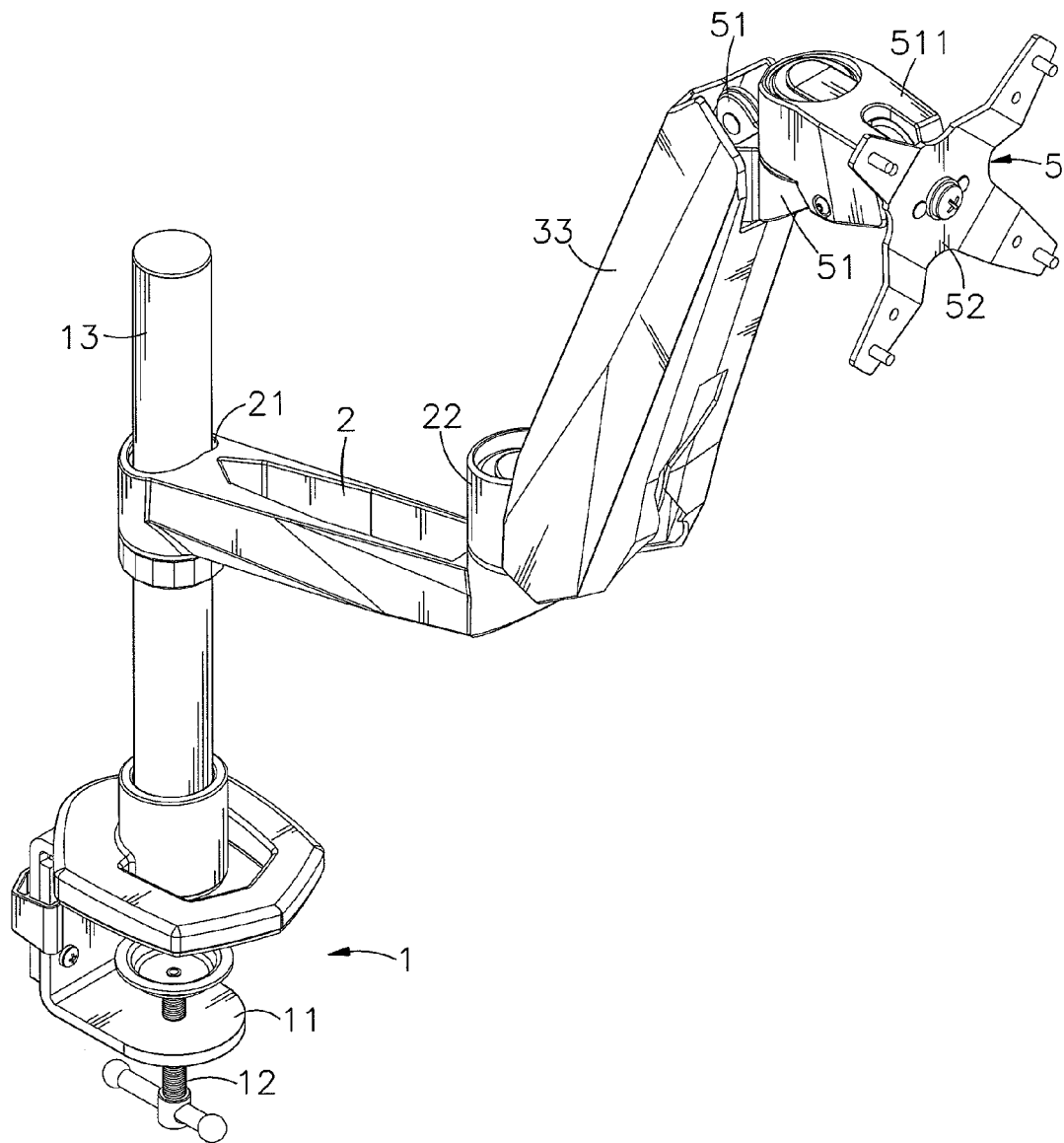
FIG. 1 is an elevational assembly view of a support stand in accordance with the present invention.
Figure 2:
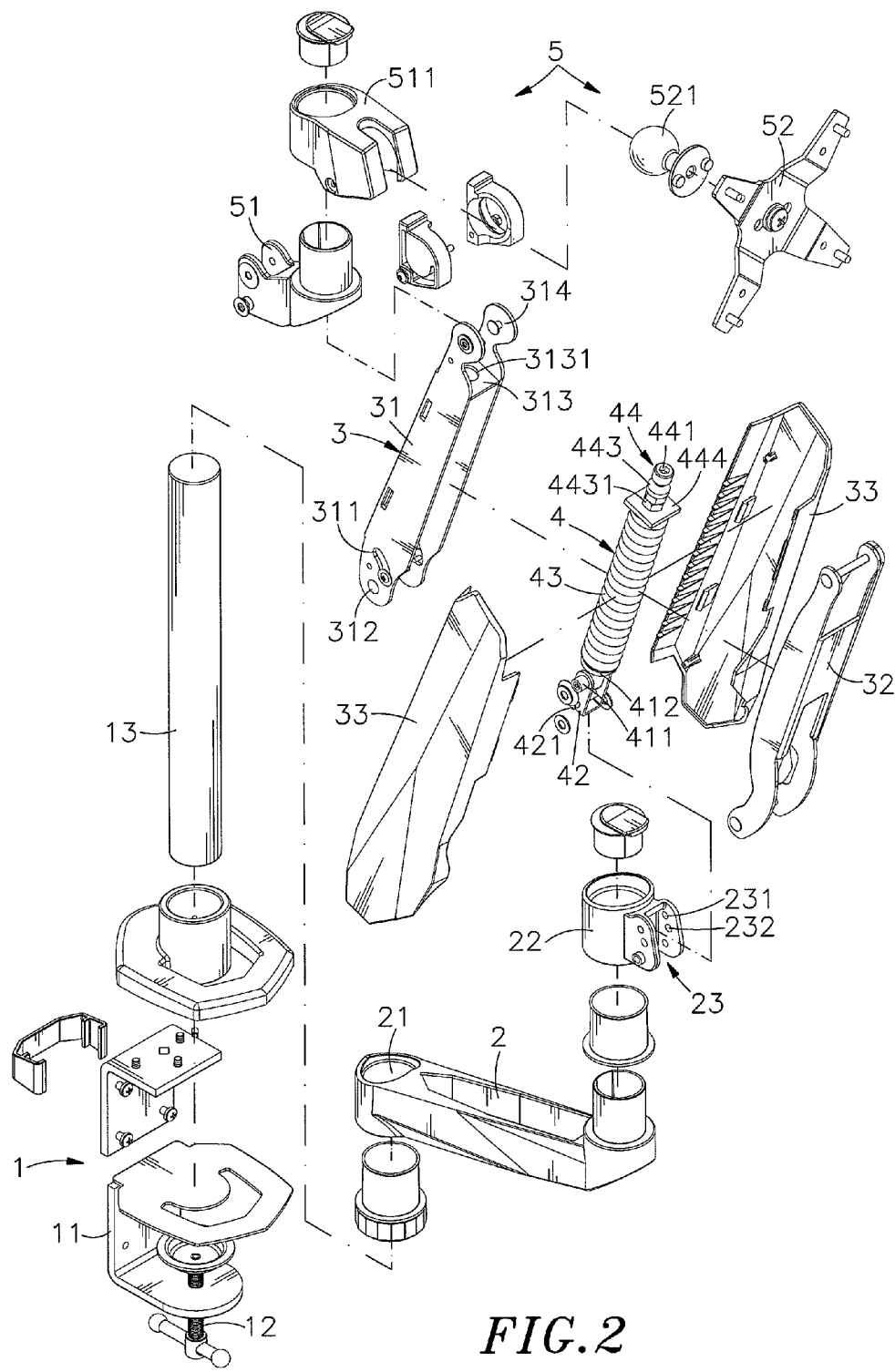
FIG. 2 is an exploded view of the support stand in accordance with the present invention.
Figure 3:
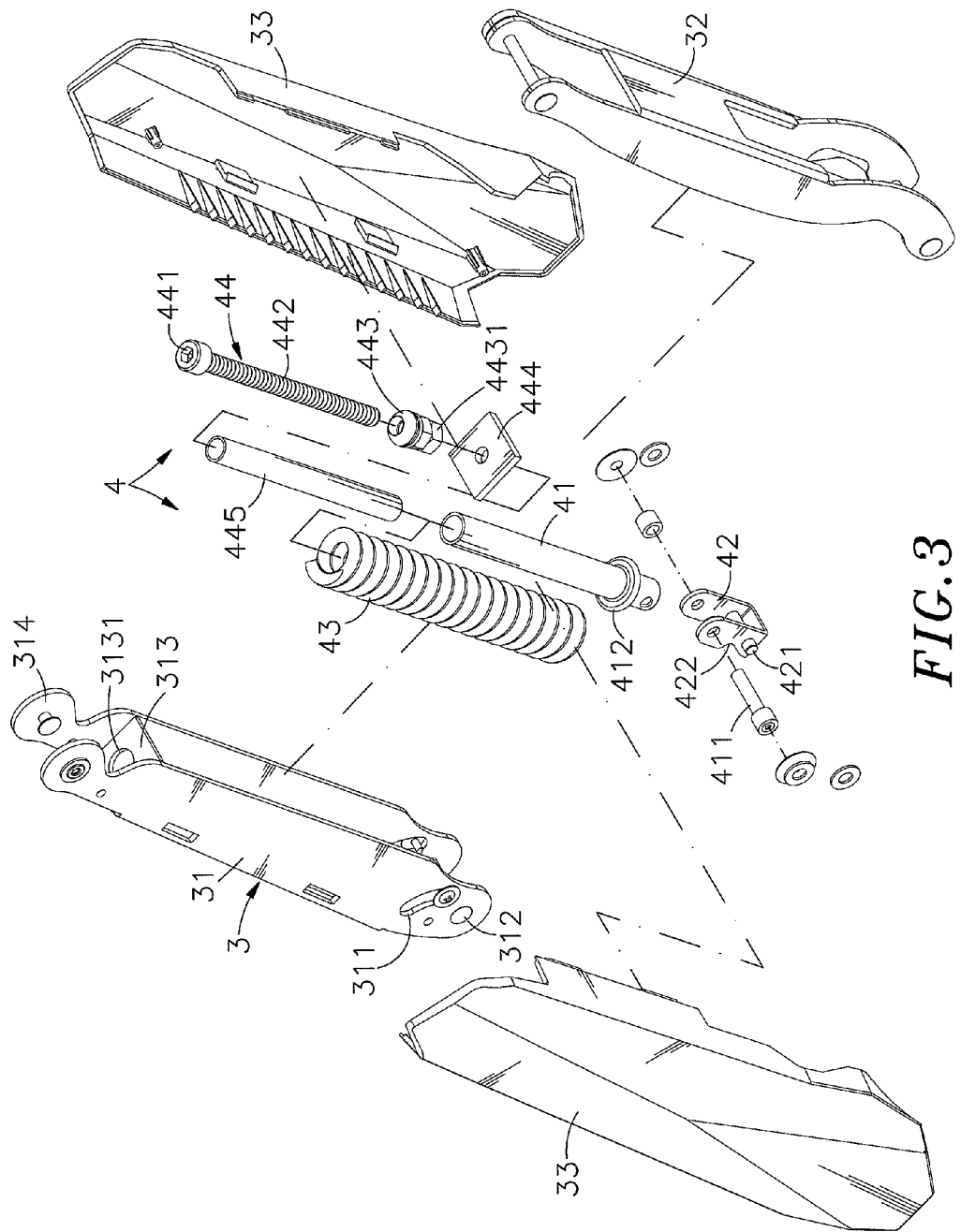
FIG. 3 is an exploded view of a part of the present invention, showing the structure of the swinging arm and the stretcher.

Referring to FIGS. 1, 2 and 3, a support stand in accordance with the present invention is shown comprising a mounting assembly 1, a suspension arm 2, a swinging arm 3, a stretcher 4 and a holder frame assembly 5.

The mounting assembly 1 comprises a substantially ⊏-shaped mounting shaft 11, a tension clamp 12 extending through the bottom side of the ⊏-shaped mounting shaft 11, and a rod member 13 vertically located on the top side of the ⊏-shaped mounting shaft 11.

The suspension arm 2 comprises a mounting barrel 21 fixedly located on one end thereof and slidably sleeved onto the rod member 13 of the mounting assembly 1, a rotary barrel 22 rotatably disposed at an opposite end thereof, and a substantially U-shaped mounting lug 23 fixedly located on the periphery of the rotary barrel 22.

The swinging arm 3 comprises a frame bar 31 that is a hollow bar. The frame bar 31 has its bottom end pivotally connected to the mounting lug 23 of the suspension arm 2 by a pivot pin 312, two arched sliding slots 311 respectively located on two opposite sidewalls thereof above the pivot pin 312, a top stop wall 313 transversely disposed at its top end, an axle hole 3131 located on the top stop wall 313, and two mounting lugs 314 bilaterally extended from its top end in a parallel manner.

The stretcher 4 is mounted inside the swinging arm 3, comprising a sleeve 41, a connection frame plate 42, a spring member 43 and an adjustment screw assembly 44. The sleeve 41 has a stop flange 412 extending around the periphery near the bottom end thereof. The bottom end of the sleeve 41 is coupled to the arched sliding slots 311 of the frame bar 31 of the swinging arm 3 by a pivot pin 411. The connection frame plate 42 is coupled to and turnable about the pivot pin 411 between the arched sliding slots 311 of the frame bar 31 of the swinging arm 3, having a pivot pin 421 transversely disposed at the bottom side thereof and pivotally connected to the U-shaped mounting lug 23 of the suspension arm 2. The spring member 43 is sleeved onto the sleeve 41 and stopped with its bottom end against the top side of the stop flange 412 of the sleeve 41. The adjustment screw assembly 44 comprises a stop plate 444 suspending inside the frame bar 31 of the swinging arm 3 and stopped at the top end of the spring member 43 below the top stop wall 313, an inner tube 445 fixedly connected to the bottom side of the stop plate 444 and inserted into the sleeve 41 inside the spring member 43, a screw rod 442 inserted through the axle hole 3131 of the frame bar 31 of the swinging arm 3 and (a hole on) the stop plate 444 into the inside of the inner tube 445, a cone head block 443 mounted on the screw rod 442 and stopped between the top stop wall 313 of the frame bar 31 of the swinging arm 3 and the stop plate 444, and an adjustment nut 441 threaded onto the screw rod 442 and stopped at the top side of the top stop wall 313 of the frame bar 31 of the swinging arm 3.

The holder frame assembly 5 comprises a steering shaft 51 pivotally connected between the two mounting lugs 314 of the frame bar 31 of the swinging arm 3, and a holder frame plate 52 coupled to the steering shaft 51 and adapted for holding, for example, a LCD monitor or telephone holder.

Figure 4:
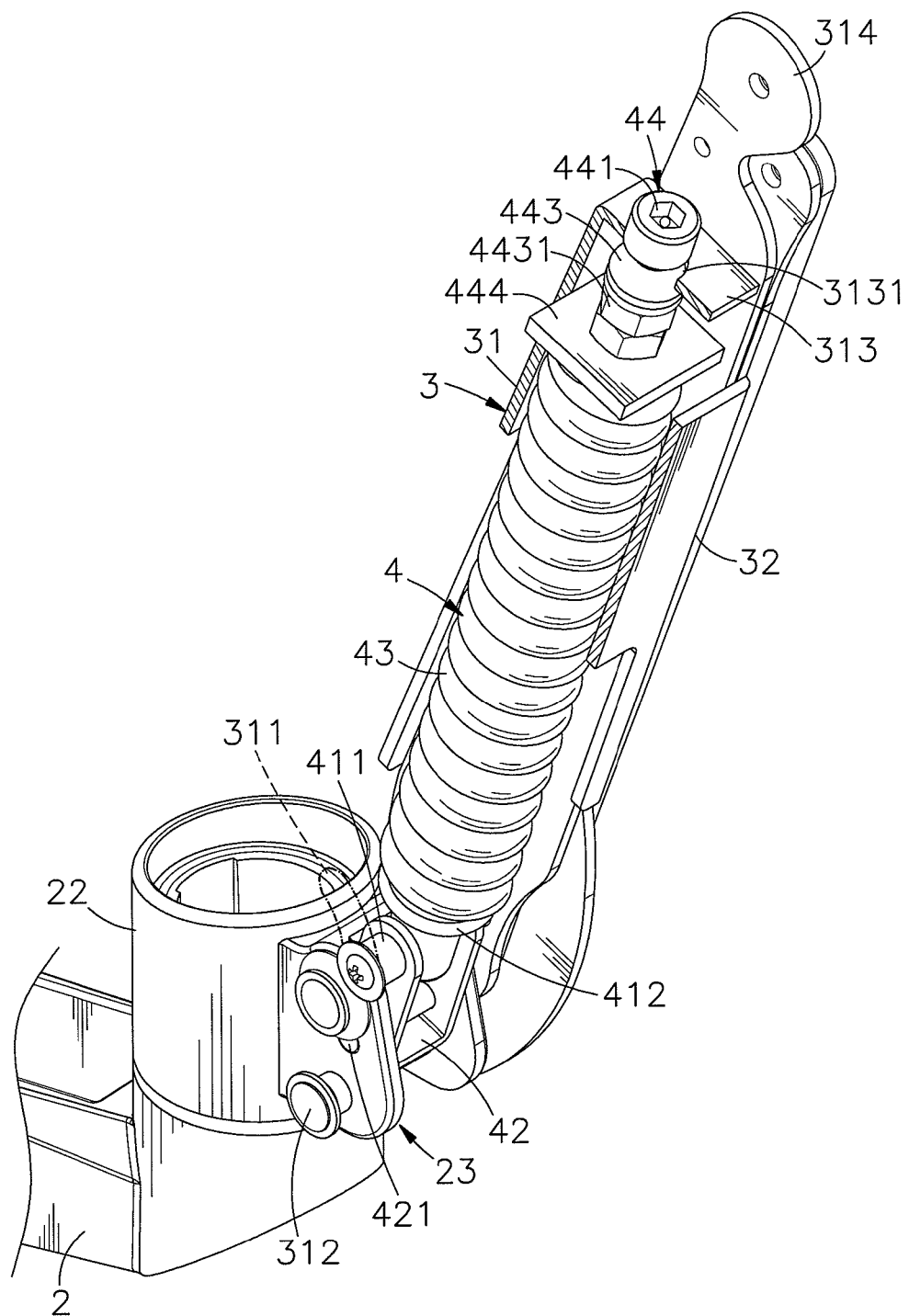
FIG. 4 is a cutaway view of a part of the present invention, showing the positioning of the stretcher in the frame bar of the swinging arm.

Referring to FIG. 4 and FIGS. 2 and 3 again, when assembling the mounting assembly 1, the suspension arm 2, the swinging arm 3, the stretcher 4 and the holder frame assembly 5, install the stretcher 4 in the frame bar 31 of the swinging arm 3 to keep the adjustment nut 441 supported on the top side of the top stop wall 313 around the axle hole 3131, the cone head block 443 stopped at the bottom side of the top stop wall 313 corresponding to the axle hole 3131, and the pivot pin 411 coupled to the arched sliding slots 311 of the frame bar 31 of the swinging arm 3, and then install the pivot pin 312 to pivotally connect the bottom end of the frame bar 31 to two upper pivot holes 231 on the two opposite sidewalls of the mounting lug 23 of the suspension arm 2, and then install the pivot pin 421 to pivotally connect the bottom side of the connection frame plate 42 to two lower pivot holes 232 on the two opposite sidewalls of the U-shaped mounting lug 23 of the suspension arm 2 to keep two locating notches 422 of the connection frame plate 42 in engagement with the pivot pin 312. At this time, the spring member 43 is kept around the sleeve 41 and stopped between the stop plate 444 and the stop flange 412; the inner tube 445 is inserted with the screw rod 442 into the sleeve 41 with the stop plate 444 kept inside the frame bar 31 of the swinging arm 3. After coupling of the swinging arm 3 and the stretcher 4 to the mounting lug 23 of the suspension arm 2, the steering shaft 51 of the holder frame assembly 5 is pivotally connected to the two mounting lugs 314 of the frame bar 31 of the swinging arm 3, and then the mounting barrel 21 of the suspension arm 2 is coupled to the rod member 13 of the mounting assembly 1, thereby completing the installation.

Figure 5:
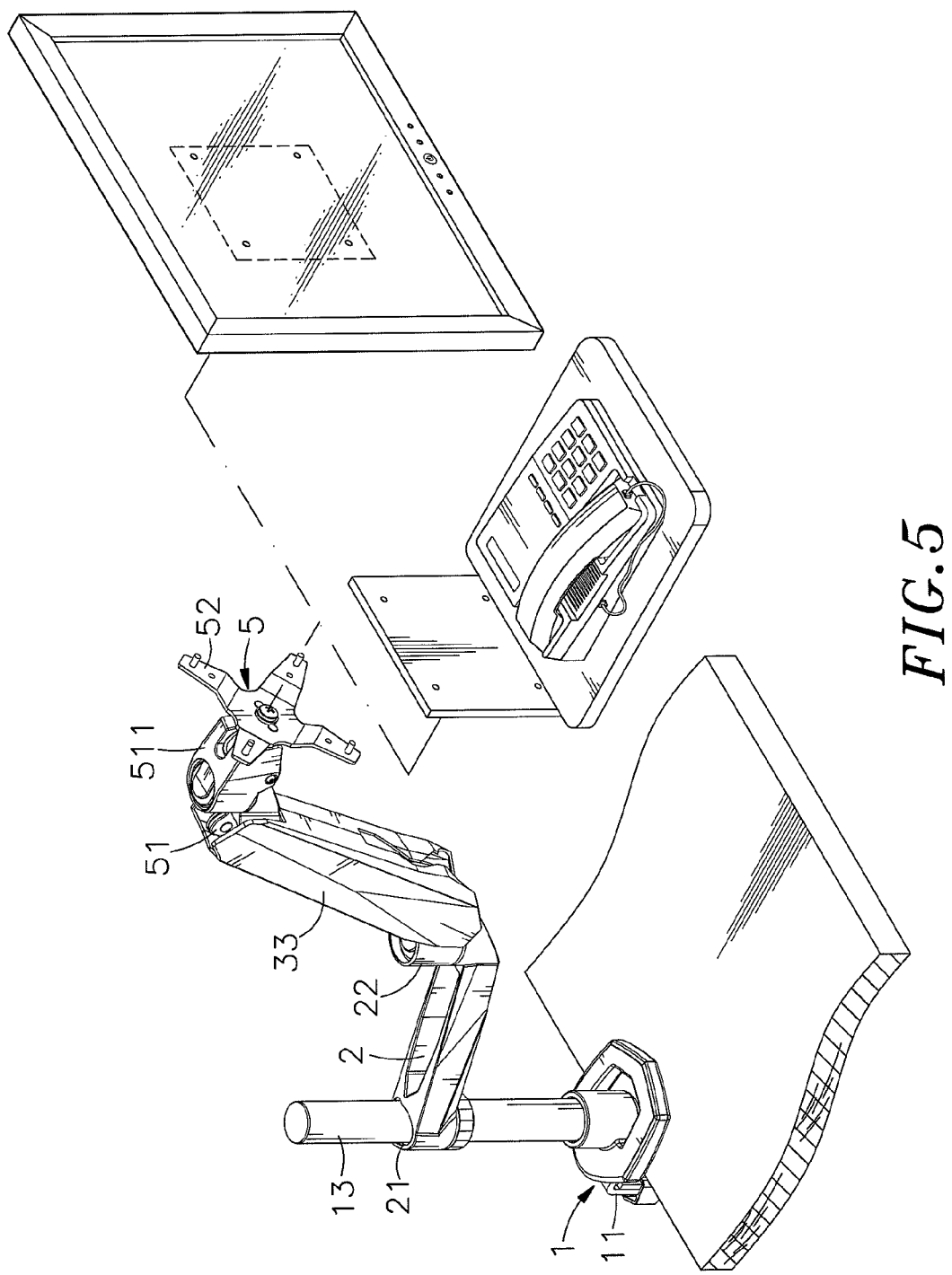
FIG. 5 is a schematic drawing showing an application example of the present invention.

Referring to FIG. 5, during use of the support stand, the ⊏-shaped mounting shaft 11 of the mounting assembly 1 is attached to one corner area of the table top of a table and locked in place by the tension clamp 12, and then the object to be supported on the support stand (for example, telephone holder or LCD monitor) is fastened to the holder frame plate 52 of the holder frame assembly 5.

Figure 6:
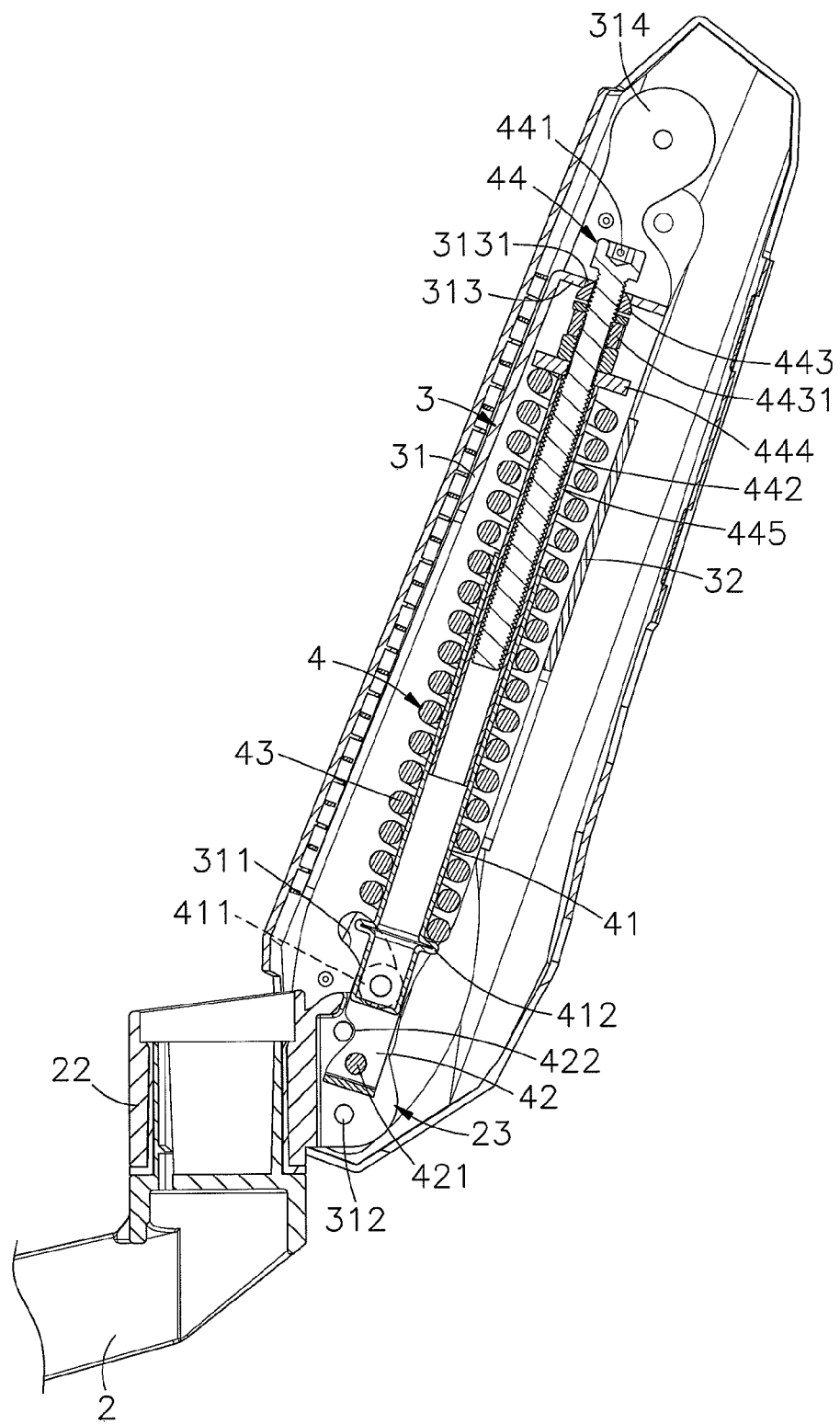
FIG. 6 is a sectional side view of the support stand in accordance with the present invention.
Figure 7:
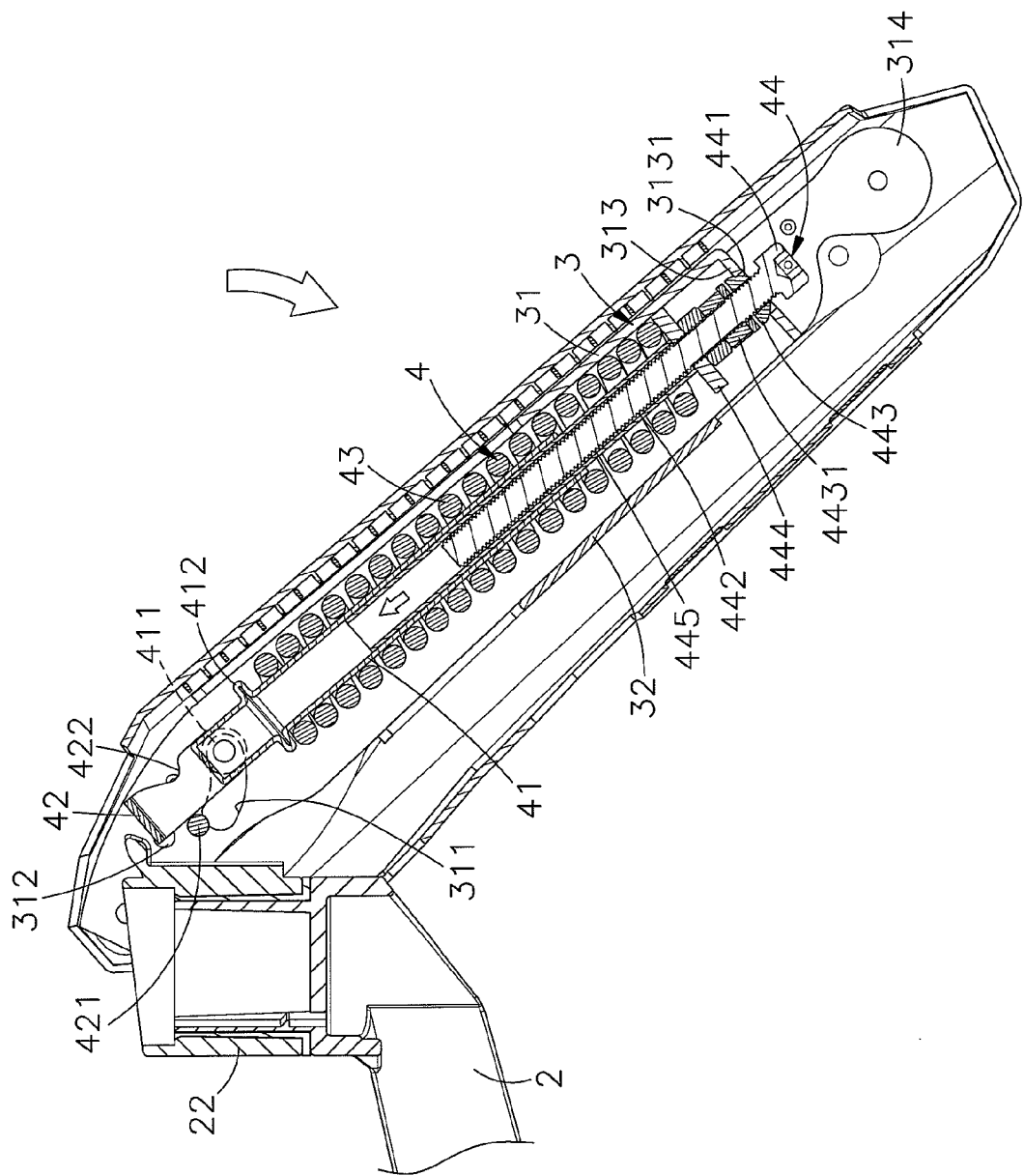
FIG. 7 corresponds to FIG. 6, showing the swinging arm downwardly adjusted.

Referring to FIGS. 6 and 7 and FIGS. 2 and 3 again, after mounting of the supported object (for example, telephone holder or LCD monitor) on the holder frame plate 52 of the holder frame assembly 5, the user can adjust the elevation of the supported object as desired. At this time, the user can turn the swinging arm 3 downwards relative to the suspension arm 2 to actuate the stretcher 4 in the frame bar 31. When turning the swinging arm 3 downwards, the pivot pin 312 is rotated with the swinging arm 3 in the upper pivot holes 231 on the two opposite sidewalls of the mounting lug 23 of the suspension arm 2, and the connection frame plate 42 is forced to turn about the axis passing through the pivot pin 421 subject to the coupling arrangement between the pivot pin 411 at the bottom end of the sleeve 41 and the arched sliding slots 311 of the frame bar 31 of the swinging arm 3 and the coupling arrangement between the pivot pin 421 of the connection frame plate 42 and the lower pivot holes 232 of the U-shaped mounting lug 23 of the suspension arm 2, causing the pivot pin 411 to be moved upwards along the arched sliding slots 311. At the same time, the cone head block 443 of the stretcher 4 is biased relative to the axle hole 3131 of the suspension arm 3, the sleeve 41 is moved upwards to force the stop flange 412 against the spring member 43. Because the top end of the spring member 43 is stopped against the stop plate 444, the spring member 43 imparts a pressure to the stop flange 412 of the sleeve 41 at this time. Thus, when the user turns the swinging arm 3 downwards relative to the suspension arm 2, the sleeve 41 and the adjustment screw assembly 44 are biased in the frame bar 31 of the swinging arm 3, enabling the swinging arm 3 to be smoothly moved to and positively positioned in the desired angular position. Therefore, subject to the actuation of the stretcher 4, the user can bias the swinging arm 3 to adjust the elevation of the supported object conveniently with less effort.

Further, the design of the adjustment screw assembly 44 of the stretcher 4 allows the user to adjust the spring power of the spring member 43 subject to the weight of the supported object at the holder frame plate 52 of the holder frame assembly 5. When rotating the adjustment nut 441 of the stretcher 4, the bottom nut 4431 of the cone head block 443 is forced by the screw rod 442 to move the stop plate 444 and the inner tube 445 downwards in the frame bar 31 of the swinging arm 3. The configuration arrangement between the stop plate 444 and the frame bar 31 causes the stop plate 444 to be moved upwards or downwards relative to the frame bar 31 during rotation of the adjustment nut 441 of the stretcher 4, preventing rotation of the stop plate 44 and the inner tube 445. When the stop plate 444 is forced to move downwards, it compresses the spring member 43 against the stop flange 412, enhancing the spring power and for allowing the holder frame assembly 5 to support a relatively heavier object positively. Thus, when a relatively heavier object is supported on the holder frame plate 52 of the holder frame assembly 5, the stretcher 4 supports the swinging arm 3 against the load of the supported object, avoiding falling of the swinging arm 3 due to the weight of the supported object. Further, the adjustment nut 441 of the adjustment screw assembly 44 is supported on the top side of the top stop wall 313 of the frame bar 31 inside the steering shaft 51 of the holder frame assembly 5. The user can insert a tool into the steering shaft 51 to rotate the adjustment nut 441 of the adjustment screw assembly 44, thereby adjusting the spring power of the spring member 43 conveniently.

Further, the mounting barrel 21 of the suspension arm 2 can be turned leftwards or rightwards relative to the rod member 13 of the mounting assembly 1, and the arrangement of the rotary barrel 22 allows the swinging arm 3 to be turned leftwards or rightwards relative to the suspension arm 2. Further, the steering shaft 51 of the holder frame assembly 5 is pivotally connected to the two mounting lugs 314 of the frame bar 31 of the swinging arm 3 and can be turned up and down relative to the swinging arm 3. Further, the holder frame plate 52 of the holder frame assembly 5 is provided with a ball member 521 that is connected to a socket member 511 at the steering shaft 51. Thus, the holder frame plate 52 can be turned through 180° horizontally as well as vertically relative to the steering shaft 51 to adjust the angular position of the supported object. The ball member 521 and the socket member 511 form a ball and socket joint. As this ball and socket joint is of the known art, no further detailed description in this regard is necessary.

Further, a front panel 32 is arranged at the front side of the frame bar 31 of the swinging arm 3, and two cover shells 33 are arranged at left and right sides around the frame bar 31. The front panel 32 and the cover shells 3 surround and protect the frame bar 31.

In conclusion, the invention provides a support stand for supporting an object (for example, telephone holder or LCD monitor), which comprises a mounting assembly 1 mountable on a table top, a suspension arm 2 coupled to a vertically arranged rod member 13 of the mounting assembly 1 to hold a rotary barrel 22, a swinging arm 3 pivotally connected with its bottom end to the rotary barrel 22 of the suspension arm 2, a stretcher 4 mounted in a frame bar 31 of the swinging arm 3 and a holder frame assembly 5 coupled to the top end of the swinging arm 3 to support an object. The stretcher 4 comprises a sleeve 41 that has its bottom end coupled to arched sliding slots 311 of the frame bar 31 of the swinging arm 3 by a pivot pin 411, a connection frame plate 42 pivotally coupled between the pivot pin 411 at the bottom end of the sleeve 41 and a mounting lug 23 at the rotary barrel 22, a spring member 43 mounted around the sleeve 41 and stopped above a stop flange 412 of the sleeve 41, and an adjustment screw assembly 44 mounted in the sleeve 41 and stopped above the spring member 43. The adjustment screw assembly 44 comprises a stop plate 444 suspending inside the frame bar 31 of the swinging arm 3 and stopped at the top end of the spring member 43 below a top stop wall 313 of the frame bar 31, an inner tube 445 fixedly connected to the bottom side of the stop plate 444 and inserted into the sleeve 41 inside the spring member 43, a screw rod 442 inserted through an axle hole 3131 on the top stop wall 313 of the frame bar 31 of the swinging arm 3 and (a hole on) the stop plate 444 into the inside of the inner tube 445, a cone head block 443 threaded onto the screw rod 442 and stopped between the top stop wall 313 of the frame bar 31 of the swinging arm 3 and the stop plate 444, and an adjustment nut 441 threaded onto the screw rod 442 and stopped at the top side of the top stop wall 313 of the frame bar 31 of the swinging arm 3. When turning the swinging arm 3 downwards or upwards, the connection frame plate 42 is biased relative to the swinging arm 3 and the sleeve 41 to compress the spring member 43 or to release the pressure from the spring member 43. Thus, the effect of the stretcher 4 enables the user to adjust the angular position of the swinging arm 3 positively with less effort Although a particular embodiment of the invention has been described in detail for purposes of illustration, various modifications and enhancements may be made without departing from the spirit and scope of the invention. Accordingly, the invention is not to be limited except as by the appended claims.

The invention claimed is:

1. A support stand, comprising a suspension arm, a holder frame assembly for supporting an object and a swinging arm coupled between said suspension arm and said holder frame assembly, wherein said swinging arm comprises a frame bar, said frame bar comprising a bottom pivot pin transversely disposed at a bottom end thereof and pivotally connected to a mounting lug of said suspension arm, two sliding slots respectively and obliquely located on two opposite sidewalls thereof above said bottom pivot pin, and two mounting lugs bilaterally extended from a top end thereof in a parallel manner for the mounting of said holder frame assembly, and a stretcher mounted in said frame bar of said swinging arm, said stretcher comprising a sleeve, said sleeve having a pivot pin transversely disposed at a bottom end thereof and coupled to and movable along said sliding slots of said frame bar of said swinging arm and a stop flange extending around the periphery above the pivot pin thereof, a connection frame plate pivotally coupled between the pivot pin at the bottom end of said sleeve and said suspension arm, and a spring member mounted around said sleeve and stopped between said stop flange of said sleeve and apart of said frame bar of said swinging arm.

2. The support stand as claimed in claim 1, wherein said frame bar is a hollow bar; said sliding slots of said frame bar are smoothly arched.

3. The support stand as claimed in claim 1, wherein said frame bar of said swinging arm further comprises a top stop wall connected between the two mounting lugs at the top end thereof and an axle hole cut through said top stop wall; a stretcher is mounted in said frame bar of said swinging arm, said stretcher comprising a sleeve, said sleeve having a pivot pin transversely disposed at a bottom end thereof and coupled to and movable along said sliding slots of said frame bar of said swinging arm and a stop flange extending around the periphery above the pivot pin thereof, a connection frame plate pivotally coupled between the pivot pin at the bottom end of said sleeve and said swinging arm, a spring member mounted around said sleeve and stopped between said stop flange of said sleeve and said top stop wall of said frame bar of said swinging arm and an adjustment screw assembly mounted in said sleeve, said adjustment screw assembly comprising a stop plate suspending inside said frame bar of said swinging arm and stopped above the top end of said spring member below said top stop wall of said frame bar, a screw rod inserted through said axle hole on said top stop wall of said frame bar and said stop plate into the inside of an inner tube, a cone head block mounted said screw rod and stopped between said top stop wall of said frame bar and said stop plate, and an adjustment nut threaded onto said screw rod and stopped at a top side of said top stop wall of said frame bar.

4. The support stand as claimed in claim 3, wherein said cone head block comprises a bottom nut threaded onto said screw rod.

5. The support stand as claimed in claim 3, wherein said stretcher further comprises an inner tube fixedly connected to a bottom side of said stop plate and inserted into said sleeve inside said spring member.

6. The support stand as claimed in claim 1, wherein said swinging arm further comprises a front panel arranged at a front side relative to said frame bar, and two cover shells respectively arranged at left and right sides relative to said frame bar and said front panel.

7. The support stand as claimed in claim 1, wherein said holder frame assembly comprises a steering shaft pivotally connected between the two mounting lugs of said frame bar of said swinging arm, and a holder frame plate coupled to said steering shaft.

8. The support stand as claimed in claim 1, wherein said suspension arm comprises a rotary barrel disposed at one end thereof; the mounting lug of said suspension arm is fixedly located on the periphery of said rotary barrel to support said bottom pivot pin of said frame bar of said swinging arm.

9. The support stand as claimed in claim 8, wherein said suspension arm further comprises a mounting barrel fixedly located on an opposite end thereof and slidably sleeved onto a vertical rod member of a mounting assembly.

* * * * *